United States Patent [19]

Smith et al.

[11] Patent Number: 5,372,352

[45] Date of Patent: * Dec. 13, 1994

[54] APPARATUS FOR SEALING A FLUID CARRYING DEVICE

[75] Inventors: Gordon M. Smith, Brookshire; Hans M. Van Der Wiel, Fulshear, both of Tex.

[73] Assignee: Johnston Pump/General Valve, Inc., Brookshire, Tex.

[*] Notice: The portion of the term of this patent subsequent to Jan. 13, 2010 has been disclaimed.

[21] Appl. No.: 589,982

[22] Filed: Sep. 28, 1990

[51] Int. Cl.⁵ .................... F16K 41/04; F16J 15/20; F16J 15/40

[52] U.S. Cl. ........................ 251/214; 73/46; 137/240; 137/312; 251/312; 277/2; 277/27; 277/59; 277/105

[58] Field of Search ............ 137/238, 240, 312; 251/214, 305, 308, 309, 312; 277/2, 59, 105, 27; 73/40.5 R, 46

[56] References Cited

U.S. PATENT DOCUMENTS

| | | | |
|---|---|---|---|
| 2,635,903 | 4/1953 | Hansen | 251/214 |
| 2,691,773 | 10/1954 | Lichtenberger | 73/46 UX |
| 3,209,830 | 10/1965 | Orr et al. | 277/2 |
| 3,307,574 | 3/1967 | Anderson | 137/312 |
| 3,429,555 | 2/1969 | Wrenshall | 251/214 |
| 3,827,285 | 8/1974 | Grove | 137/312 |
| 3,991,974 | 11/1976 | Bonafous | 251/214 |
| 4,010,769 | 3/1977 | DeLorenzo et al. | 137/312 |
| 4,022,424 | 5/1977 | Davis et al. | 251/214 |
| 4,230,299 | 10/1980 | Pierce, Jr. | 251/214 |
| 4,353,388 | 10/1982 | Isoyama et al. | 251/214 |
| 4,383,546 | 5/1983 | Walters, Jr. | 251/327 |
| 4,660,591 | 4/1987 | Brown et al. | 251/214 |
| 4,901,751 | 2/1990 | Story et al. | 137/312 |
| 4,916,938 | 4/1990 | Aikin et al. | 277/2 |
| 4,972,867 | 11/1990 | Ruesch | 137/312 |
| 5,078,175 | 1/1992 | Martin et al. | 251/214 |

Primary Examiner—George L. Walton
Attorney, Agent, or Firm—Leonard Tachner

[57] ABSTRACT

A novel sealing arrangement for fluid carrying devices and particularly for plug type valves, such as retractable double block and bleed plug valves. The sealing arrangement of the present invention adds secondary and tertiary seals to the conventional packing gland primary seal along the outer surface of the trunnion of such plug type valves. A unique isolated chamber is formed between the secondary and tertiary seals and because of the elastomeric nature of the secondary and tertiary seals, this isolated chamber is bubble tight and thus resists the gradual accumulation of minute leakage, which might otherwise cause false alarms in prior art leakage sensing equipment. Furthermore, the bubble tight feature of a chamber between isolated elastomeric seals, enables purging this chamber for making accurate observations and measurements of true leakage that might otherwise be an environmental hazard. Still more significantly, the bubble tight aspect of the chamber formed between the secondary and tertiary seals of the present invention, provides a means for providing an over-pressure in the chamber by using an inert fluid, such as nitrogen gas, which significantly increases the sealing efficacy of the present invention, as well as providing both local and remote sensing of leakage prevention status, by simply monitoring the over-pressure condition within the chamber. The chamber may also be evacuated to provide enhanced leak detection capability.

11 Claims, 4 Drawing Sheets

APPARATUS FOR SEALING A FLUID CARRYING DEVICE

BACKGROUND OF THE INVENTION

1. Field of the Invention

The present invention relates generally to improved sealing in fluid carrying devices such as double block and bleed plug valves and more specifically to an improved sealing configuration wherein elastomeric, secondary and tertiary seals supplement the stuffing box/packing gland sealing integrity and provide an overpressure chamber for preventing environmentally unsafe leaks.

2. Prior Art

The environmental protection agency and other agencies are presently pressing the valve industry for improvements in stuffing box/packing gland integrity. Packing glands and similar mechanical seals, wear and age and eventually leak to atmosphere, creating environmental problems, especially when the media flowing through the valve is hazardous or life threatening. Clearly, all seals eventually age and wear and ultimately do leak. Accordingly, a dependable and provable method to predict leakage before it occurs, would be a highly desirable improvement in such applications.

Various methods are presently used to improve packing gland sealability and to prevent potential leaks therethrough. The method currently perceived to be the most dependable for improving packing gland sealability and predicting and controlling packing gland leakage, is known as a bellows seal. Bellows seals are simply flexible pressure vessels that are used in plug type valves in combination with the mechanical stuffing box/packing gland primary seals. However, bellows are limited in their axial and rotational capabilities. Furthermore, as they age, they are subject to fatigue and failure, consequently a monitoring or sniffing access is often required. An older method for improving packing gland sealability involves installation of two seals separated by a void that is usually filled with a device called a lantern ring. A cross drilled access hole is usually provided to monitor the void between the two seals. A "sniffer" may be used to monitor the leakage of the seal closest to the pressure source (primary seal) while the redundant seal (secondary seal) prevents interim leakage until the primary seal can be serviced. Unfortunately, merely providing a secondary or redundant seal to create a void between the primary seal and the redundant seal, allows accumulated, insignificant leakage to create false alarms, i.e., apparent but false indication of significant leakage of the primary seal which requires unnecessary and high cost maintenance.

There is therefore an ongoing need for a dependable method for improving the ability to predict leakage before it actually occurs in a fluid carrying device such as a plug type valve, in applications involving particularly hazardous or life threatening media flowing through the valve. Such a need includes improving the currently available sealing techniques and overcoming the fatigue and failure concerns regarding bellows and the frequent false alarms occurring in the use of a single secondary seal to create a void between the primary seal and the secondary seal.

SUMMARY OF THE INVENTION

In the present invention, three distinct seals are utilized. The seal closest to the process media is a fire safe packing which acts as the primary seal during and after a plant fire. This packing seal is made, typically, of graphite in a cartridge or square section ring. In normal service, this packing seals the pressurized media, wipes the trunnion shaft clean and deposits a thin layer of solid lubricant on the surface of the reciprocating and rotating trunnion shaft. This, in turn, helps to isolate, protect and lubricate the remaining seals of the invention, which are generally elastomeric. More specifically, the secondary seal is made of an elastomeric material which provides a bubble tight seal that is superior for monitoring purposes over compressible packing. Elastomeric seals minimize the accumulation of negligible leaks between infrequent periodic monitoring processes, such as for example, every three months. Accordingly, elastomeric seals minimize the occurrence of false alarms. A second redundant seal, namely a tertiary seal, also elastomeric and also providing a bubble tight seal, forms an outer boundary beyond which virtually no leakage can pass. The use of secondary and tertiary elastomeric seals, provides a bubble tight chamber between the two redundant seals. This chamber is a perfect environment to monitor the true "rate of leakage" without false alarms that might otherwise occur as a result of "accumulated leakage".

In the preferred embodiment of the invention, the chamber formed between the secondary and tertiary seals is injected with a pressurized gas such as nitrogen which may be lubricated. The pressure of the gas in this chamber will normally exceed the process pressure. By way of example, if the valve is working at 150 psi, the chamber may be pressurized to, for example, 500 psi. This considerably higher pressure in the chamber between the secondary and tertiary seals, absolutely prevents any media leakage until the pressure in the chamber between the secondary and tertiary seals drops to a level below the process pressure. Monitoring of this positive pressure may be done locally with a pressure gauge or remotely with a pressure switch. In addition, the chamber may be connected to a source of a large volume of high pressure gas which could effectively extend the life of the sealing structure of the present invention indefinitely. In addition, a purge connection is provided, as well as a monitor connection, both of which may be used to eliminate accumulated minute leakage to preclude false alarms. The purge source may be either gaseous or liquid. Because of the novel chamber of the present invention, which is formed by secondary and tertiary elastomeric seals, a positive purge technique may be used to replace the requirement for a leak detection system. Furthermore, a positive purge is easily monitored with a simple gauge, replacing expensive, sophisticated and delicate leak detection equipment.

The present invention constitutes a significant improvement in dependable environmental protection by creating a positive pressure/absolute seal. It is compact, field retrofittable and extremely dependable. It constitutes a significant improvement over the bellows technique for improving packing gland sealability. It is fire safe while bellows are not. Secondly, as the seals age and wear, purge pressure can be added to delay service until scheduled shutdown. Bellows on the other hand, need immediate attention. The present invention is also less expensive and easier to repair as compared to bellows. Furthermore, bellows may leak for long periods of time without detection, while the positive purge capability of the present invention provides a means for immediate detection of leaks. The present invention allows the use of conventional packing glands which are fire safe, wipe, lubricate and clean the trunnion and allow endless axial and rotational movement.

OBJECTS OF THE INVENTION

It is therefore a principal object of the present invention to provide a novel sealing technique to prevent atmospheric leaks of media flowing through fluid carrying devices such as plug type valves, wherein any such leak would be hazardous or life threatening.

It is an additional object of the present invention to provide an improved sealing configuration for a retractable seal, double block and bleed plug valve in which the usual fire safe packing gland seal is augmented by both a secondary seal and a tertiary seal, both made of elastomeric materials to form a leak proof chamber therebetween and which may be pressurized by an inert fluid to a pressure level that exceeds the media pressure of the valve, thereby creating a positive pressure sealing capability which may be monitored either locally or remotely and which pressure may be augmented from time to time to extend the life of the seal indefinitely.

It is still an additional object of the present invention to provide an improved sealing configuration for fluid carrying or controlling devices such as double block and bleed plug valves wherein reliable monitoring of media leakage may be achieved without the occurrence of false alarms due to the accumulated leakage of packing gland materials over a long period of time.

It is still an additional object of the present invention to provide an improved sealing configuration primarily for non-lubricated, retractable seal, double block and bleed plug valves which obviates the prior art need for expensive, sophisticated and delicate leak detection equipment.

BRIEF DESCRIPTION OF THE DRAWINGS

The aforementioned objects and advantages of the present invention, as well as additional objects and advantages thereof, will be more fully understood hereinafter as a result of a detailed description of a preferred embodiment when taken in conjunction with the following drawings in which.

DETAILED DESCRIPTION OF A PREFERRED EMBODIMENT

Figure 1:
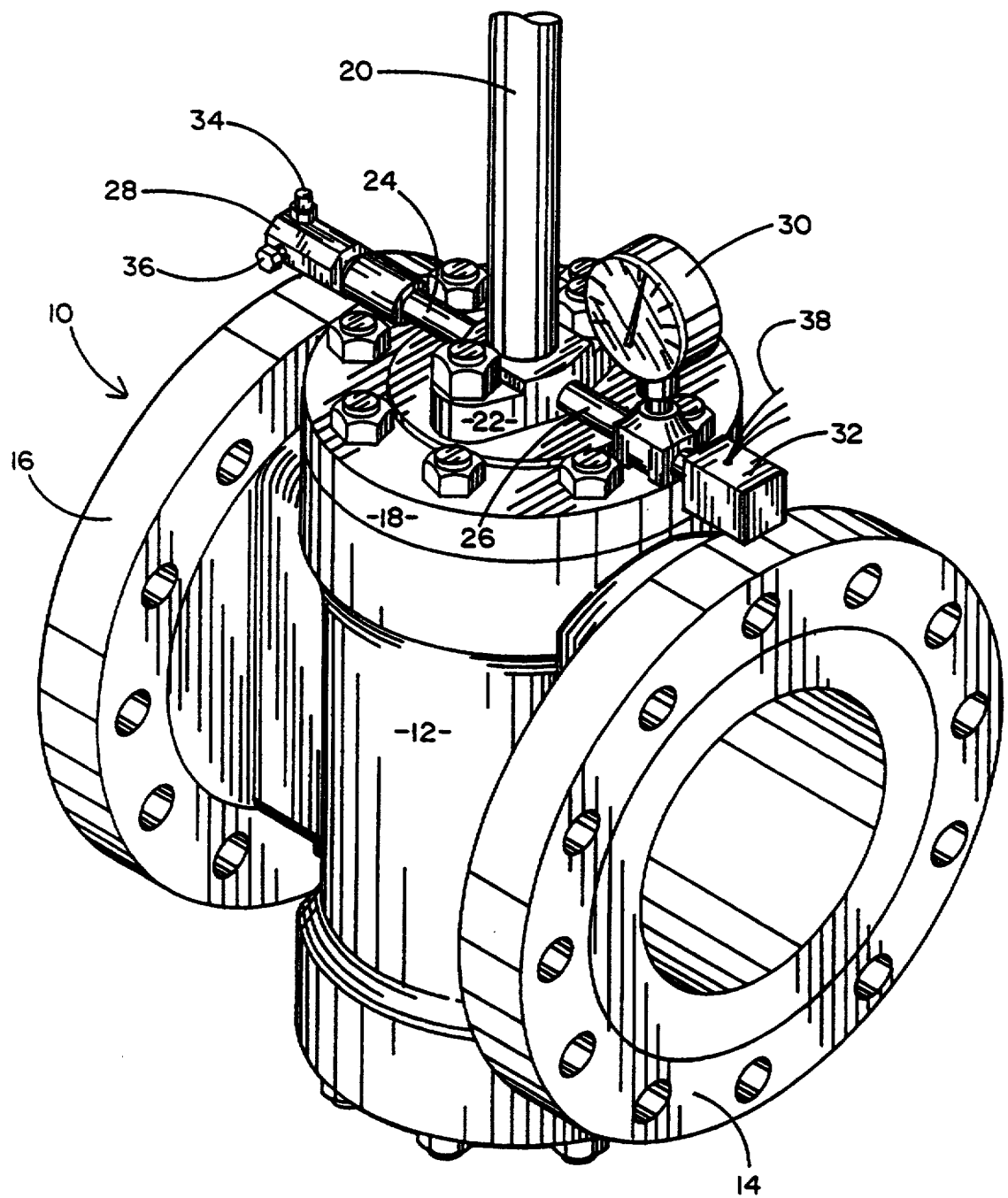
FIG. 1 is an isometric view of a triple packed non-lubricated retractable seal double block and bleed plug valve in which the sealing and monitoring configuration of the present invention has been implemented.
Figure 2:
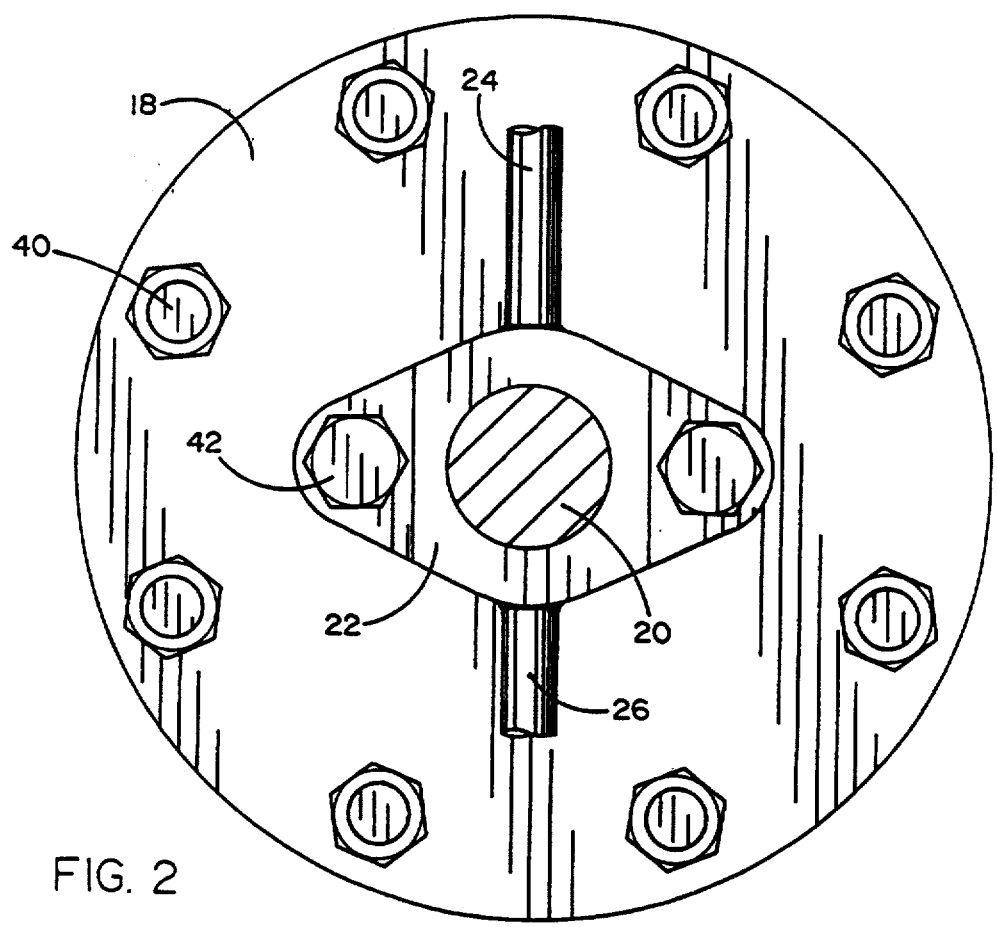
FIG. 2 is a top view of a plug valve in which the secondary and tertiary sealing feature of the present invention has been implemented.
Figure 3:
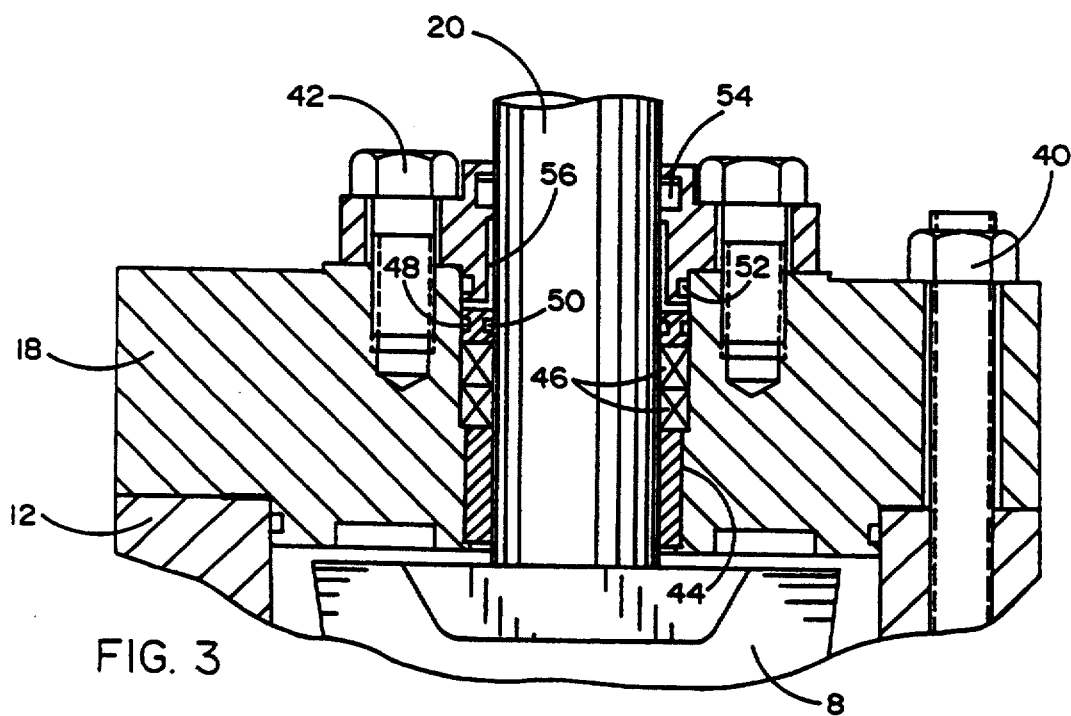
FIG. 3 is a cross-sectional view of the plug valve of FIG. 1, showing the location of the secondary and tertiary seals therein, relative to the packing gland seal.
Figure 4:
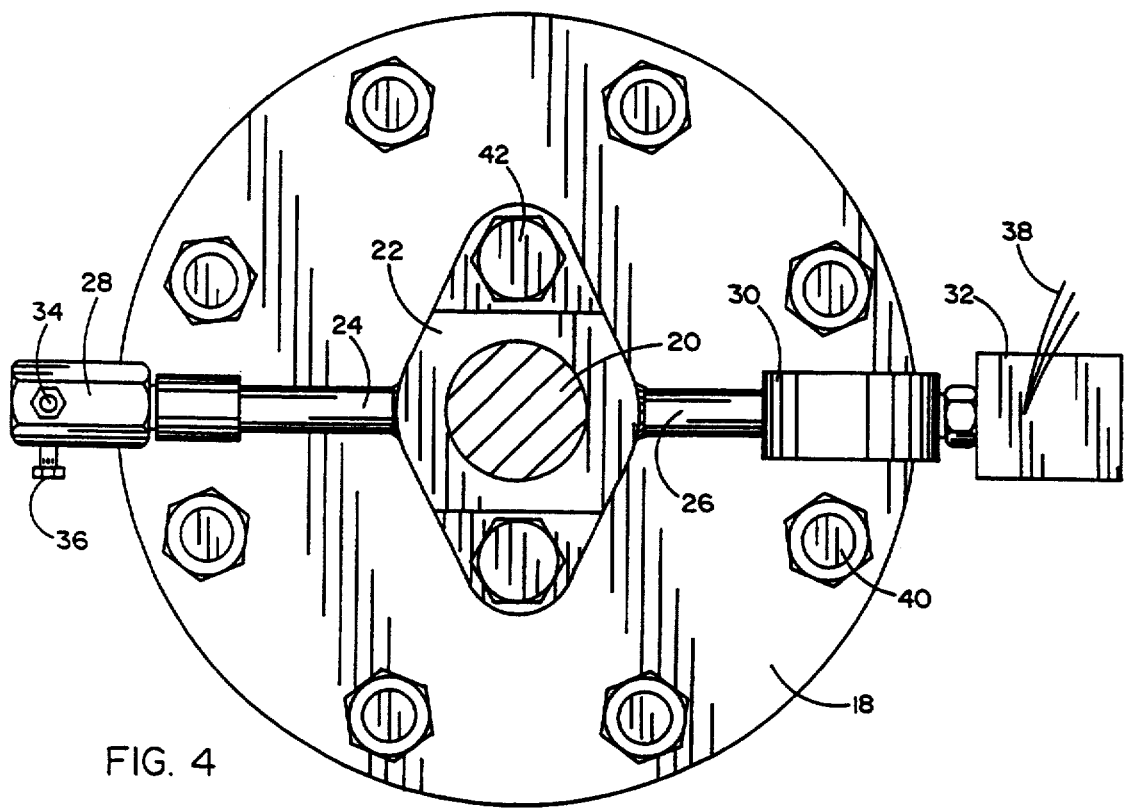
FIG. 4 is a view of the top of the plug valve similar to that of FIG. 1, but showing interconnection with devices for monitoring and purging potential media leakage in the chamber between the secondary and tertiary seals.
Figure 5:
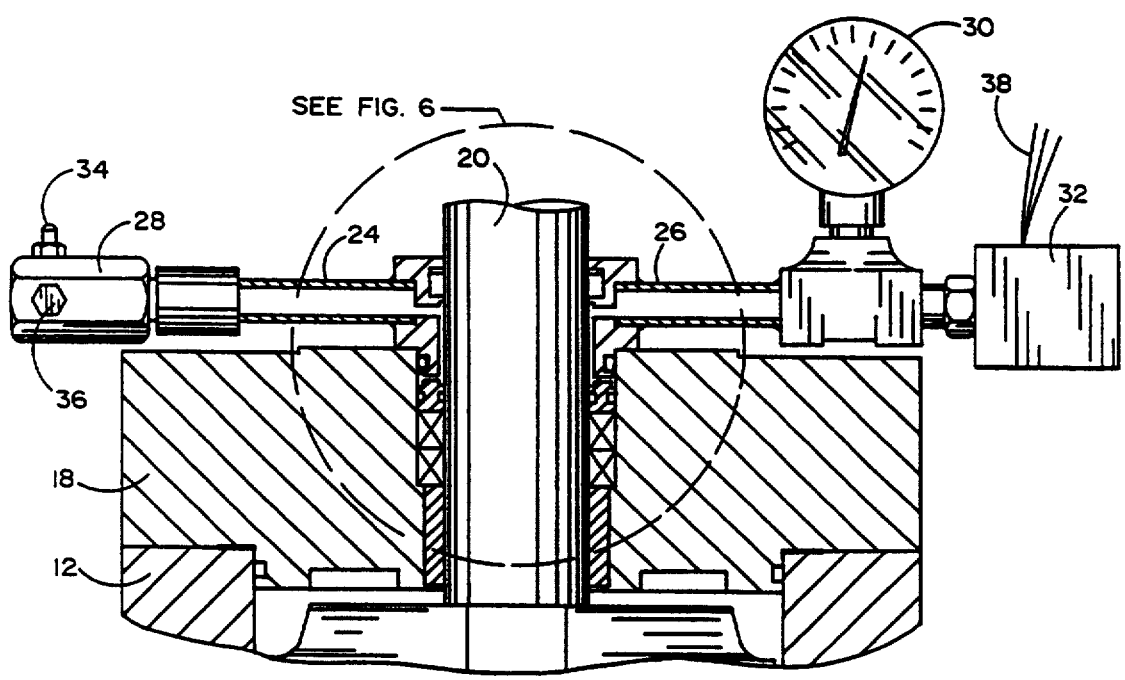
FIG. 5 is a cross-sectional view of the valve, similar to that of FIG. 2, but showing the fluid interconnections between the chamber of the present invention and monitoring and purging devices.

Referring now to FIG. 1, it will be seen that plug type valve 10 of the present invention comprises a valve body 12 to which are integrally attached flanges 14 and 16, and which is enclosed at its top by a bonnet 18 through which passes an upper trunnion 20 which is enclosed by a gland 22. Unique to the present invention are a purge fill interface 24 and a purge monitor interface 26 which extend laterally from the gland 22 in the direction of flow through flanges 14 and 16. Purge fill interface 24 is connected to a purge valve 28 while purge monitor interface 26 is connected to a monitor gauge 30 and a remote purge pressure monitor 32. Purge valve 28 is provided with a fill port 34 and a relief port 36. Remote purge pressure monitor 32 is provided with a plurality of wires 38 through which monitor 32 may transmit signals to provide purge pressure information to a remote location.

Referring now to FIGS. 2-5, it will be seen that the bonnet 18 is secured to the body 12 of the valve by a plurality of bonnet bolts 40 and that the gland 22 is, in turn, secured to the bonnet 18 by a pair of cover bolts 42. It will also be seen that the upper trunnion 20, which extends vertically upward through the bonnet 18, is secured or otherwise integrally connected to a plug 8, the position of which determines whether the valve 10 is in its open or closed configuration. Furthermore, it will be seen that trunnion 20 is provided with a bushing 44 in coaxial contiguous engagement therewith for bearing against the trunnion 20 during translation and rotation of the trunnion and plug 8 for opening and closing the valve. Immediately above bushing 44, there is positioned a pair of packing gland primary seal cartridges 46 an expedient, that is well known in the art for inhibiting the leakage of media under pressure from the interior of valve body 12 through bonnet 18 along the outer surface of trunnion 20.

Figure 6:
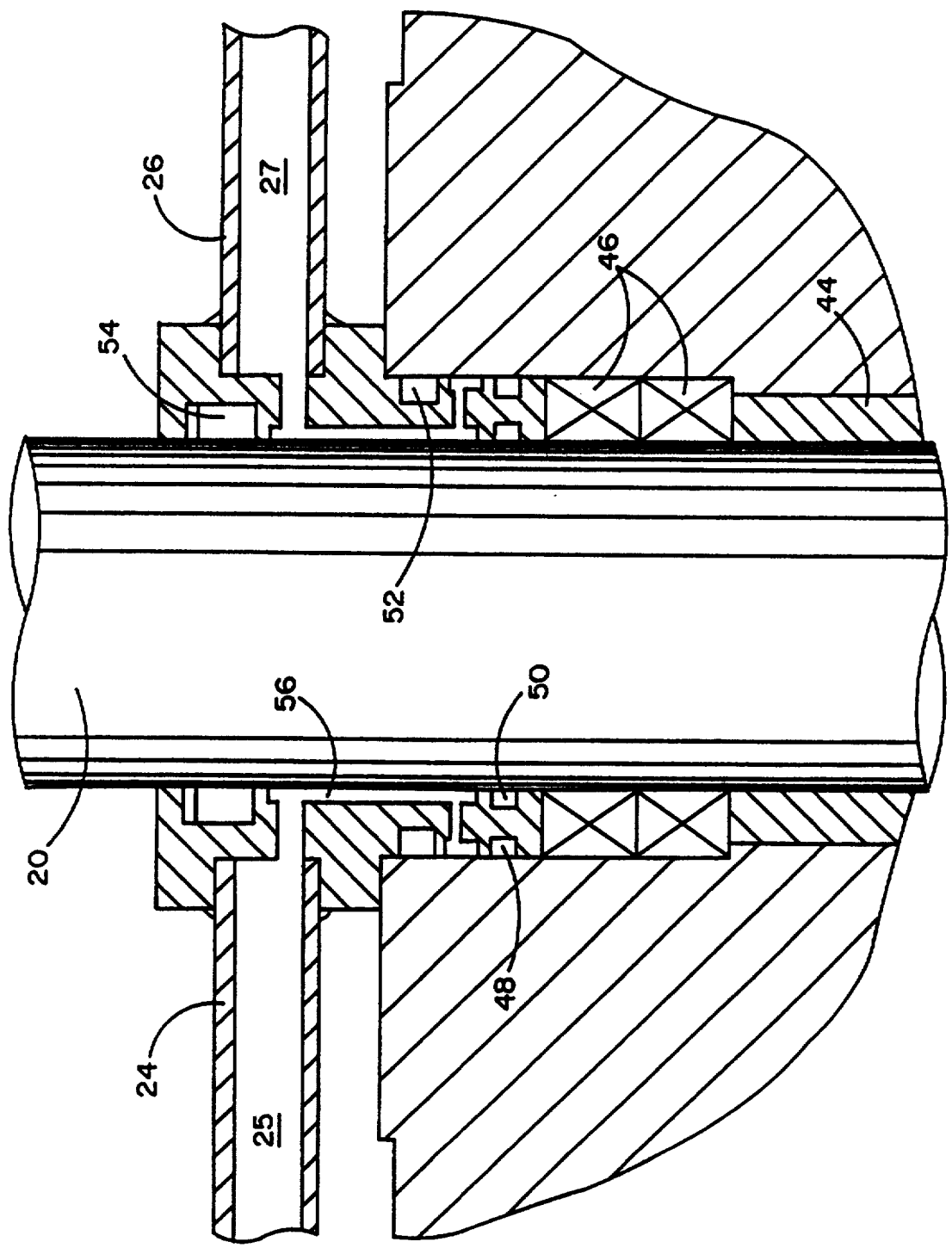
FIG. 6 is an enlarged view of the relevant portion of FIG. 5 illustrating in greater detail the formation of the chamber of the present invention between the secondary and tertiary seals thereof.

However, unlike the prior art known to the applicant, the present invention provides second and third stage sealing capability which is unique in the art of plug valves. More specifically, referring briefly to FIG. 6, it will be seen that above bushing 44 and packing seals 46, there is provided a secondary outer seal 48, a secondary inner seal 50, a tertiary outer seal 52 and a tertiary inner seal 54. All of the seals 48, 50, 52 and 54 are preferably made of an elastomeric compound, which unlike the conventional packing primary seal cartridges 46 (which is made of a graphite material in the form of a cartridge or square section ring), is resistant to even minute leakage, such as through permeation and the like. The present invention contemplates the use of the primary seal in the form of a packing seal 46 because of its beneficial effects, in so far as fire safety is concerned, as well as sealing the pressurized media while wiping the trunnion shaft clean and depositing a thin layer of solid lubricant on the reciprocating and rotating trunnion shaft. In fact, this feature of the conventional packing primary seal helps to isolate, protect and lubricate the secondary and tertiary seals which are, in turn, bubble tight seals, superior for monitoring purposes over compressible packing.

Because of secondary seals 48 and 50, and tertiary seals 52 and 54, a bubble tight chamber 56 is formed therebetween along the surface of upper trunnion 20. This monitor or purge chamber 56 is in fluid communication with the purge fill interface 24 and the purge monitor interface 26 by means of the corresponding purge channel 25 and monitor channel 27.

While the addition of secondary seals 48 and 50 and tertiary seals 52 and 54, all made of a bubble tight elastomeric material, provides a significant sealing improvement as compared to the prior art previously described, the provision of a monitor of purge chamber 56 therebetween and the fluid communication therewith of channeled interfaces 24 and 26 in the preferred embodiment of the invention, provide still an additional significant improvement over the prior art. More specifically, the purging capability of the present invention permits accurate real time sensing of actual media leakage. This obviates the noted prior art false alarms that occur due to gradual leakage through the packing gland seal and that permits minute, but nevertheless, long term accumulation of media that might otherwise be sensed falsely as a significant leak, requiring immediate attention. On the other hand, in the present invention, it is possible to purge chamber 56 through purge fill interface 24 and then monitor in real time, any actual significant leakage that may thereafter be sensed.

However, an additional significant improvement over the prior art is provided in the present invention as a result of the uniquely isolated chamber formed between the secondary and tertiary seals. More specifically, in the present invention, monitor or purge chamber 56 may be over-pressured as compared to the media pressure. Chamber 56 can be injected with an inert fluid media such as nitrogen to a pressure which exceeds the process media pressure. By way of example, if the valve 10 is working at a pressure of 150 psi, chamber 56 may be pressured to 500 psi. This significant over-pressure within chamber 56 would absolutely prevent media leakage until the pressure drops to below 150 psi. Monitoring of this elevated pressure may be done locally by means of gauge 30 or it may be accomplished remotely by means of pressure monitor 32 whereby remotely located maintenance personnel may periodically observe 16 the pressure status within chamber 56 at a central location. Then, simply by noting that the chamber pressure is greater than the media pressure, maintenance personnel may be assured that there is absolutely no leakage into the environment from the gland seal of the present invention. Furthermore, although not shown in the figures described, it is entirely feasible to connect purge monitor interface 26 to a large pressurized supply of inert fluid media, such as a remotely located pressurized nitrogen source. Such a source may be either manually or automatically actuated for increasing the pressure within chamber 56, whenever the gauge 30 or pressure monitor 32 senses a pressure reduction therein to a value near or below the process media pressure within the valve body 12.

It will be seen that because of the unique sealing arrangement of the present invention, a compact field retrofittable and dependable sealing arrangement is provided which better protects the environment and provides triple protection against environmental leaks of hazardous or even life-threatening media from a plug type valve. The present invention may be used to minimize false-alarm-causing leakage accumulation that otherwise commonly occurs through conventional packing gland primary seals. Furthermore, the present invention permits the use of a predictable service routine, whereby a pressurized, isolated chamber formed between secondary and tertiary seals, can be used to inhibit leakage through even faulty packing gland primary seals until planned down times to permit less costly maintenance. Furthermore, once such maintenance is required, if necessary, the secondary and tertiary seals which are not in direct contact with the valve media, may be easily replaced without handling the primary seal which is contaminated because of its direct contact with the media. The present invention utilizes conventional fire safe packing gland material which is not only fire safe, but wipes, lubricates and cleans the trunnion in a conventional manner.

One of the significant advantages of the present invention is its lower cost, both with regard to the initial installation of the sealing structure and the cost of maintenance thereafter. The present invention is less expensive than bellows and easier to repair as compared to bellows. Furthermore, bellows provide only a local indication of leakage and only by utilizing additional leak detection equipment, which tends to be expensive, sophisticated and delicate. Furthermore, the present invention, unlike any prior art known to the applicant, provides for remote observation of the status of the seals within the valve, either by the use of a readily observable analog gauge or by a pressure monitoring sensor, which may be readily connected electrically to remote locations, such as by direct wiring, shown in FIG. 5, or by radio transmission. The elevated pressure capability of the present invention, in the chamber formed between two sets of isolated bubble type elastomeric seals, provides the unique capability for predicting potential leakage before it occurs. Simply by monitoring the over-pressure status of the chamber and even postponing the need for immediate resolution of leakage situations by simply replenishing the chamber pressure, maintenance personnel can effectively schedule valve repair without fear of catastrophic effects on the environment in the interim.

It will now be understood that what has been disclosed herein, comprises a novel sealing arrangement for fluid valves and particularly for plug type valves, such as retractable double block and bleed plug valves. The sealing arrangement of the present invention adds secondary and tertiary seals to the conventional packing gland primary seal along the outer surface of the upper trunnion of such plug type valves. A unique isolated chamber is formed between the secondary and tertiary seals and because of the elastomeric nature of the secondary and tertiary seals, this isolated chamber is bubble tight and thus resists the gradual accumulation of minute leakage, which might otherwise cause false alarms in prior art leakage sensing equipment. Furthermore, the bubble tight feature of a chamber between isolated elastomeric seals, enables purging this chamber for making accurate observations and measurements true leakage that might otherwise be an environmental hazard. Still more significantly, the bubble tight aspect of the chamber formed between the secondary and tertiary seals of the present invention, provides a means for providing an over-pressure in the chamber by using an inert fluid, such as nitrogen gas, which significantly increases the sealing efficacy of the present invention, as well as providing both local and remote sensing of leakage prevention status, by simply monitoring the over-pressure condition within the chamber.

Those having skill in the art to which the present invention pertains, will now as a result of the applicants' teaching herein, perceive various modifications and additions which may be made to the invention. By way of example, the precise location of the secondary and tertiary seals, as well the materials of which such seals are made, may be readily altered while still providing the advantageous features of the present invention. Numerous triple seal configurations combining the prior art packing gland as a primary seal along with secondary and tertiary seals which provide a chamber therebetween can be used either for monitoring leakage or monitoring an over-pressure fluid therein which further protects the environment from inadvertent leakage of the process media. Furthermore, devices other than valves may advantageously employ the sealing arrangement of the present invention. Accordingly, all such modifications and additions are deemed to be within the scope of the invention which is to be limited only by the claims appended hereto.

We claim:

1. In a plug valve of the type having a plug, the position of which is controlled by a trunnion disposed about a portion of a plug stem for opening and closing the plug, the trunnion having a primary seal in the form of a compressible packing gland in surrounding abutting engagement with the trunnion to prevent the leakage of process media between the trunnion and the valve bonnet; an improved seal comprising:
   at least one elastomeric secondary seal positioned adjacent said trunnion above said primary seal for sealing about a portion of said plug stem; and
   at least one elastomeric tertiary seal positioned adjacent said trunnion above said secondary seal for sealing about another portion of said plug stem;
   said secondary and tertiary seals forming a substantially leak proof a pressurized fluid chamber therebetween for increasing the sealing efficiency along said plug stem, said chamber being isolated from said primary seal.

2. The improved seal recited in claim 1 further comprising a source of high pressure fluid and means connecting said source to said chamber for pressurizing said chamber to a pressure level which exceeds the pressure level of said process media within said valve.

3. The improved seal recited in claim 1 further comprising means for purging said chamber and means for monitoring the presence of process media within said chamber.

4. The improved seal recited in claim 1 further comprising means for monitoring the pressure within said chamber.

5. The improved seal recited in claim 4 wherein said monitoring means comprises a pressure gauge attached externally to said valve and means for connecting said gauge for fluid communication with said chamber.

6. The improved seal recited in claim 4 wherein said monitoring means comprises a pressure switch in fluid communication with said chamber and means for transmitting the on/off status of said pressure switch to a location remote from said valve.

7. In a plug-type valve of the type having a trunnion surrounding a portion of a plug-type valve stem controlling the opening and closing of a plug, an improved sealing configuration comprising:
   a primary seal coaxially engaging the surface of said trunnion;
   a secondary seal positioned above said primary seal and coaxially adjacent said trunnion; and
   a tertiary seal positioned above said secondary seal and coaxially adjacent said trunnion;
   said secondary and tertiary seals being made of an elastomeric compound for forming a substantially fluid-tight pressurized chamber therebetween for increasing the sealing efficiency along said plug-type valve stem, said chamber being isolated from said primary seal.

8. The improved sealing configuration recited in claim 7 further comprising means in fluid communication with said chamber for purging and monitoring the contents of said chamber.

9. The improved sealing configuration recited in claim 7 further comprising means in fluid communication with said chamber for pressurizing said chamber to a pressure level exceeding the pressure level of media adjacent said plug.

10. The improved sealing configuration recited in claim 7 further comprising means for indicating the pressure level within said chamber.

11. A plug-type valve comprising:
   a valve body;
   a plug in said valve body;
   a plug stem comparatively attached to said plug;
   a trunnion extending along said plug stem for opening and closing said valve by altering the position of said plug;
   a seal assembly preventing leakage from said valve body along said trunnion, said seal assembly having a primary seal, in abutting engagement with said trunnion a secondary seal and a tertiary seal being disposed above said primary seal; said secondary and tertiary seals being made of an elastomeric compound for forming a substantially fluid-tight chamber therebetween for increasing the sealing efficiency along said plug stem, said chamber being isolated from said primary seal;
   said chamber being adapted for pressurization for further preventing said leakage along said plug stem.

* * * * *